UNITED STATES PATENT OFFICE.

FRIEDRICH BLASSNECK AND AMÖNE BLASSNECK, OF SEESEN, GERMANY.

PROCESS OF PRESERVING OR COOKING FRUITS OR VEGETABLES.

1,028,669. Specification of Letters Patent. Patented June 4, 1912.

No Drawing. Application filed December 1, 1911. Serial No. 663,259.

*To all whom it may concern:*

Be it known that we, FRIEDRICH BLASSNECK, manufacturer, and AMÖNE BLASSNECK, late Miss LEUBEN, subjects of the Duchy of Brunswick, Empire of Germany, residing at 438 Frankfurterstrasse, Seesen-on-Harz, Duchy of Brunswick, Empire of Germany, have invented certain new and useful Improvements in the Process of Preserving or Cooking Fruits or Vegetables, of which the following is a specification.

Our invention relates to improvements in the process of preserving or cooking fruits or vegetables, and the object of the improvements is to cook or preserve the fruits or vegetables in such a way, that they do not lose their natural color.

Heretofore in cooking or preserving the natural color of the vegetables has been maintained by treating the same with soda or bicarbonate of soda. However, this method is objectionable, because the vegetables do not allow of being sterilized at high temperatures without losing their green color, so that they must be sterilized several times. Furthermore, it has been suggested to dye the vegetables or fruits with suitable dyes after they have lost their natural color or to restore the color by reducing agents. In carrying this method into effect it has been found difficult to impart to the vegetables their proper tints. Besides the said dye stuffs are more or less liable to injure the health of the consumers. The vegetables which have been treated with reducing agents are open to the same objections as those which have been treated with soda, in so far as they are again uncolored when sterilized at high temperatures.

The object of our improvements is to avoid these disadvantages, and for this purpose the natural dye stuff of the vegetables or fruits to be preserved or cooked is fixed or set in the skin and pulp, before it can be altered by boiling.

In carrying our improved method out we treat the vegetables or fruits, if necessary after boiling the same, about 15 minutes in a weak solution of caustic lime, after which they are freed of the lime solution and then filled into cans, glasses, or the like in which they are sterilized in the usual way at high temperatures.

Experiments have shown that vegetables and fruits preserved according to our improved process are very durable, and that their savor and digestibility are improved. The process is particularly effective in preserving spinach, green cabbage, peas, and strawberries. Peas which are preserved according to this process are made less gelatinous.

If desired, the vegetables and fruits treated by our improved process may be used for dyeing other vegetables and fruits.

Instead of caustic lime, baryta or strontium oxid may be used. However, in this case care must be taken, because these substances are poisonous when used in large quantities. When carrying the process into effect in the proper manner, the quantities of the chemicals left in the canned goods are so small, that the health of the consumers is not endangered.

In order that our improved method be more clearly understood, a few examples thereof are given hereafter.

First example: 50 kilograms of fresh spinach are thoroughly washed and soaked for about 15 or 20 minutes in a solution which is prepared from 80 liters of water and 1 kilogram of finely elutriated slaked caustic lime. The lime is prepared from one part of unslaked lime and three parts of water. After the spinach has thus been treated, it is boiled soft and crushed. It is then canned and sterilized 60 minutes at a temperature of 128 degrees.

Second example: 50 kilograms of fresh spinach are thoroughly washed and put into a kettle into which are poured or stirred 80 liters of water and ½ kilogram of caustic lime. After the spinach has been allowed to stand a while, it is thrown little by little into water heated to the point of ebullition and boiled down, the mass being stirred during the boiling. It is then drained on a sieve and flushed with cold water. After crushing the spinach it is canned and sterilized 60 minutes at a temperature of 128 degrees.

Third example: 50 kilograms of fresh spinach are thoroughly washed and boiled down while adding water, and then placed in a tub containing 20 liters of water and 400 grams of lime paste. In this liquid the spinach is left about 20 minutes, whereupon it is squeezed out, crushed, canned and sterilized 60 minutes at a temperature of 128 degrees centigrade.

Fourth example: 50 kilograms of fresh strawberries are freed of their stems, washed, placed in a solution which consists of 25 liters of water and 1 kilogram of lime paste. After the fruit has stood in this liquid from 20 to 30 minutes, it is removed therefrom, washed with cold water, filled into cans together with sugar which may contain a little lime, and sterilized in the usual way.

We claim herein as our invention:

1. The herein described method of preserving or cooking fruits and vegetables, which consists in treating the fruits or vegetables with a solution of an oxid of an alkaline earth metal, to set the natural color in the skin and pulp thereof and boiling the same.

2. The herein described method of preserving or cooking fruits and vegetables, which consists in treating the fruits or vegetables with a solution of caustic lime, to set the natural color in the skin and pulp thereof and boiling the same.

3. The herein described method of preserving or cooking fruits and vegetables, which consists in boiling the fruits or vegetables, treating the same with a solution of an oxid of an alkaline earth metal, to set the natural color in the skin and pulp thereof, and boiling the same.

In testimony whereof we have hereunto set our hands in presence of two subscribing witnesses.

FRIEDRICH BLASSNECK.
AMÖNE BLASSNECK.

Witnesses:
  WILHELM LEHRKE,
  JULIUS SECKEL.